United States Patent
Lee

(10) Patent No.: US 9,929,427 B2
(45) Date of Patent: Mar. 27, 2018

(54) BATTERY MODULE HAVING REINFORCING BARRIER WITH METAL MEMBER

(71) Applicant: SAMSUNG SDI CO., LTD., Yongin-si, Gyeonggi-do (KR)

(72) Inventor: Jang-Wook Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 237 days.

(21) Appl. No.: 14/558,878

(22) Filed: Dec. 3, 2014

(65) Prior Publication Data

US 2015/0162639 A1 Jun. 11, 2015

(30) Foreign Application Priority Data

Dec. 10, 2013 (KR) .................. 10-2013-0152812

(51) Int. Cl.
- *H01M 6/42* (2006.01)
- *H01M 10/04* (2006.01)
- *H01M 2/14* (2006.01)
- *H01M 2/10* (2006.01)

(52) U.S. Cl.
CPC ..... *H01M 10/0413* (2013.01); *H01M 2/1072* (2013.01); *H01M 2/1077* (2013.01); *H01M 2/14* (2013.01); *H01M 2220/20* (2013.01); *Y10T 29/49002* (2015.01)

(58) Field of Classification Search
CPC ........... H01M 10/0413; H01M 2/1072; H01M 2/1077; H01M 2/14; H01M 2220/20; Y10T 29/49002

USPC ......................................... 429/149
See application file for complete search history.

(56) References Cited

U.S. PATENT DOCUMENTS

| 2011/0244309 | A1* | 10/2011 | Byun | H01M 2/043 429/158 |
| 2013/0052516 | A1 | 2/2013 | Kim | |
| 2014/0099527 | A1* | 4/2014 | Seong | H01M 2/1077 429/120 |

FOREIGN PATENT DOCUMENTS

| KR | 10-2011-0109843 A | 10/2011 |
| KR | 10-2013-0021135 A | 3/2013 |
| KR | 10-2013-0125341 A | 11/2013 |

OTHER PUBLICATIONS

Korean Office Action dated May 9, 2016.

* cited by examiner

*Primary Examiner* — Gary Harris
(74) *Attorney, Agent, or Firm* — Lee & Morse, P.C.

(57) ABSTRACT

A battery module includes a battery array including a plurality of battery cells arranged in a first direction and a plurality of separation barriers respectively interposed among the battery cells, side frames at two opposite sides of the battery array along the first direction, and at least one reinforcing barrier between two adjacent battery cells in the battery array, the reinforcing barrier having a metal member in a surface facing a corresponding side frame, and the metal member being fixed to the corresponding side frame.

19 Claims, 6 Drawing Sheets

BATTERY MODULE HAVING REINFORCING BARRIER WITH METAL MEMBER

CROSS-REFERENCE TO RELATED APPLICATION

Korean Patent Application No. 10-2013-0152812 filed on Dec. 10, 2013, in the Korean Intellectual Property Office, and entitled: "BATTERY MODULE," is incorporated by reference herein in its entirety.

BACKGROUND

1. Field

Embodiments relate to a battery module, and more particularly, to a battery module available for an electric vehicle or hybrid electric vehicle.

2. Description of the Related Art

In general, unlike primary batteries which are not rechargeable, secondary batteries are rechargeable and dischargeable. The secondary batteries are used as energy sources of, e.g., mobile devices, electric vehicles, hybrid electric vehicles, electric bicycles, uninterruptible power supplies, etc. The secondary batteries may be used in the form of a single battery or in the form of a battery module in which a plurality of batteries are electrically connected and packed as a single unit, according to the type of an external device to which the secondary batteries are applied.

Small-sized mobile devices, e.g., cellular phones, can be operated for a predetermined amount of time by using the power and capacity of a single battery. On the other hand, since the power and capacity of a single battery may be insufficient, battery modules are frequently used in devices, e.g., electric vehicles and hybrid electric vehicles, consuming large amounts of power for a long time. The battery modules are used by connecting a required number of batteries in parallel or series according to output and capacity.

SUMMARY

According to embodiments, there is provided a battery module including a battery array having a plurality of battery cells arranged in a first direction and a plurality of separation barriers respectively interposed among the battery cells, side frames at two opposite sides of the battery array along the first direction, and at least one reinforcing barrier between two adjacent battery cells in the battery array, the reinforcing barrier having a metal member in a surface facing a corresponding side frame, and the metal member being fixed to the corresponding side frame.

The reinforcing barrier may be positioned at the center of the barrier array, based on the first direction.

The reinforcing barrier may be formed relatively thicker than the other barriers.

The metal member may be formed of the same material as the side frame.

The metal member and the side frame may be formed of stainless steel.

The metal member may include an inserting portion inserted and fixed inside the reinforcing barrier; a welding portion exposed to an outside to be fixed to the side frame; and an extending portion extended from the inserting portion to the welding portion by passing through a surface of the reinforcing barrier.

The width of the inserting portion may be formed wider than that of the extending portion.

The width of the welding portion may be formed wider than that of the extending portion.

The metal member and the reinforcing barrier may be formed through injection molding.

Upper and lower end portions of the side frame may be respectively bent toward upper and lower surfaces of the battery array.

A buffer member may be provided between the bent portion of the side frame and the battery array.

The metal member of the at least one reinforcing barrier may be exposed through the surface of the reinforcing barrier to an exterior of the reinforcing barrier.

At least one separation barrier among the plurality of separation barriers may be the at least one reinforcing barrier.

Only one of a reinforcing barrier or a separation barrier is between every two adjacent battery cells.

According to other embodiments, there is provided a method of manufacturing a battery module including arranging a plurality of battery cells in a first direction and a plurality of separation barriers respectively interposed among the battery cells to define a battery array, arranging side frames at two opposite sides of the battery array along the first direction, and affixing at least one reinforcing barrier between two adjacent battery cells in the battery array, the at least one reinforcing barrier including metal member in a surface facing a corresponding side frame, and the metal member being fixed to the corresponding side frame by soldering or welding.

The metal member and the reinforcing barrier may be formed through injection molding.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
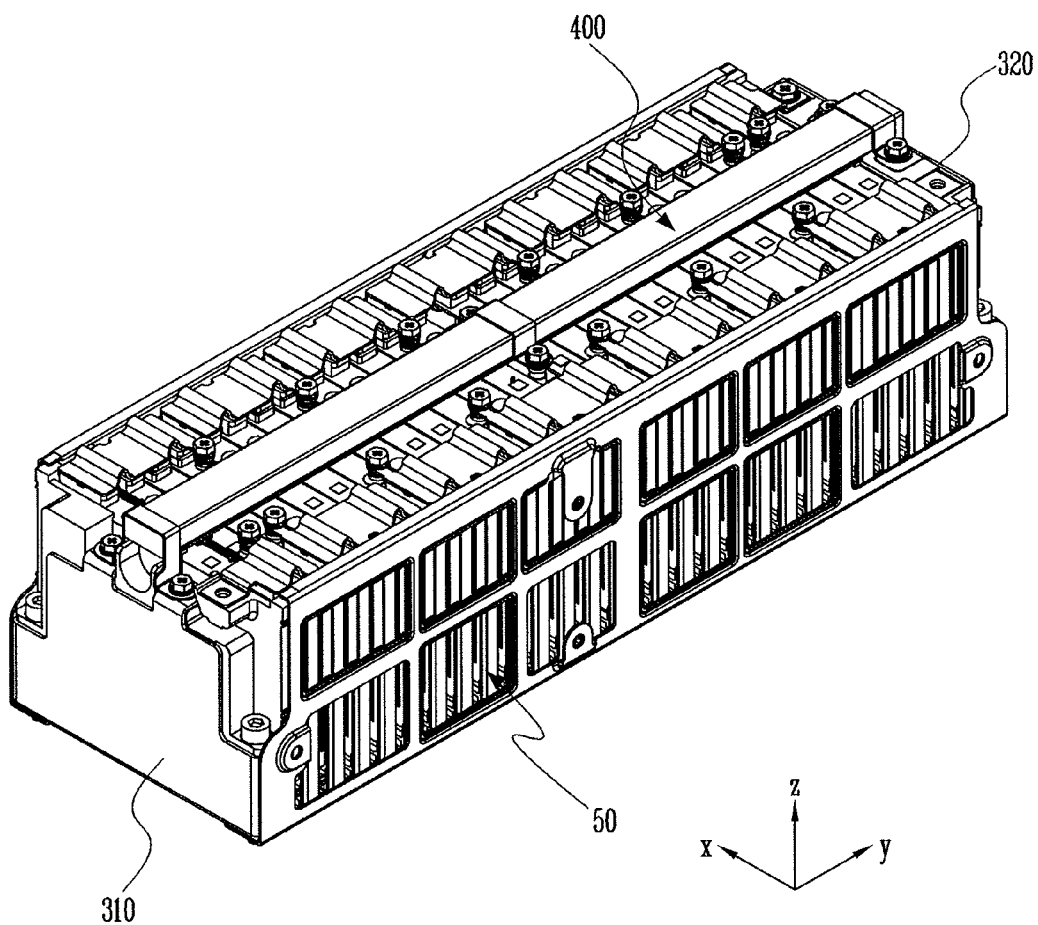
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. In addition, it will be understood that when an element is referred to as being "between" two elements, it can be the only element between the two elements, or one or more intervening elements may also be present. Further, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements throughout.

Figure 2:
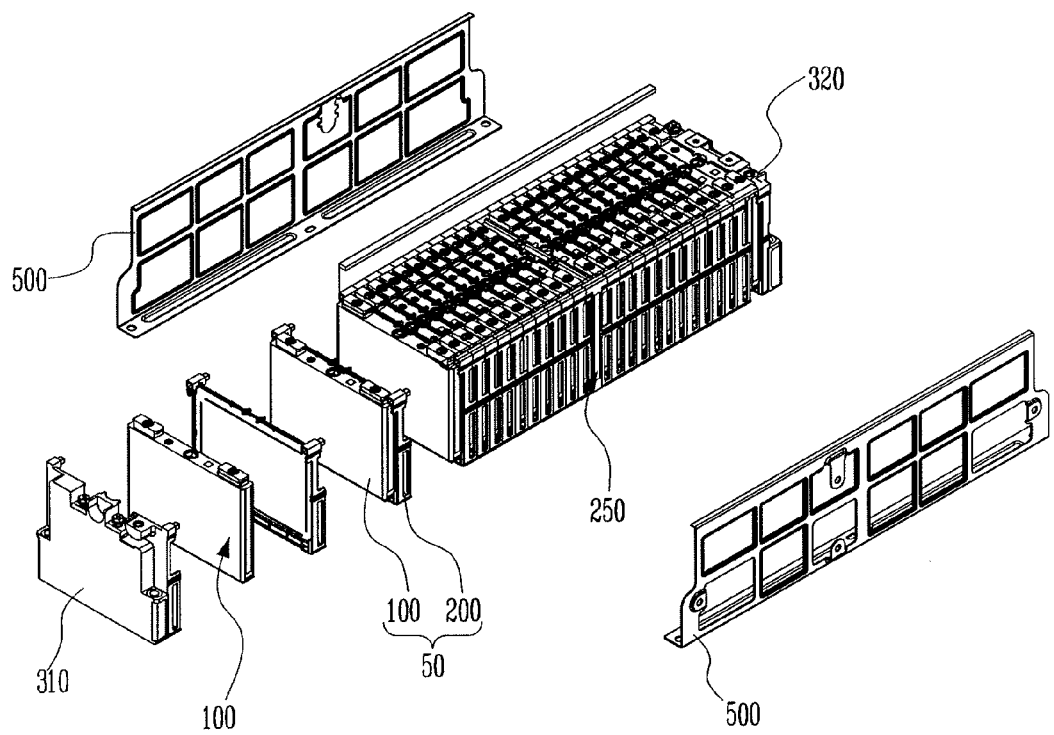
FIG. 2 illustrates an exploded perspective view of a battery module according to an embodiment.

FIG. 1 is a perspective view of a battery module according to an embodiment. FIG. 2 is an exploded perspective view of the battery module in FIG. 1.

As shown in FIGS. 1 and 2, a battery module 10 according to this embodiment has an outer frame structure which enables a battery array 50 to be regularly fixed. The outer frame structure may include side frames 500, end blocks 310 and 320, and a reinforcing barrier 250.

The battery array 50 may be formed so that a plurality of battery cells 100 and a plurality of barriers 200, e.g., separation barriers, are arranged in one direction. The barriers 200 are respectively provided between the battery cells 100. A degassing unit 400 and the like may be provided on the battery array 50. The degassing unit 400 guides, to an outside of the battery module 10, gas which may flow out from the battery cells 100 of the battery array 50.

The pair of end blocks 310 and 320 may be respectively provided at both end portions of the battery array 50, i.e., outside of outermost battery cells 100. The side frames 500 may be respectively provided at both sides of the battery cells 100 and the barriers 200.

In this case, the side frames 500 and the end blocks 310 and 320 may be firmly fixed through, e.g., structural coupling, screw fastening, or the like. In addition, when necessary, upper and lower portions of the side frame 500 may be bent to directly/indirectly support upper and lower portions of the battery array 50. That is, upper and lower end portions of the side frame 500 may be respectively bent toward upper and lower surfaces of the battery array 50, to directly/indirectly support the upper and lower portions of the battery array 50. In this case, a buffer member (not shown) may be applied to the bent portion of the side frame 500, and accordingly, it may be possible to prevent external impact from being directly transferred to the battery array 50.

As an increased number of battery cells in a conventional battery module gradually increases an entire length of the conventional battery module, the external shape of the conventional battery module may be easily changed due to the weight of the battery cells included in the battery module. However, in the battery module 10 according to the present embodiment, the reinforcing barrier 250 is provided at, e.g., at a central portion of, the battery module 10 in order to improve the structural stability of the battery module 10.

Figure 3:
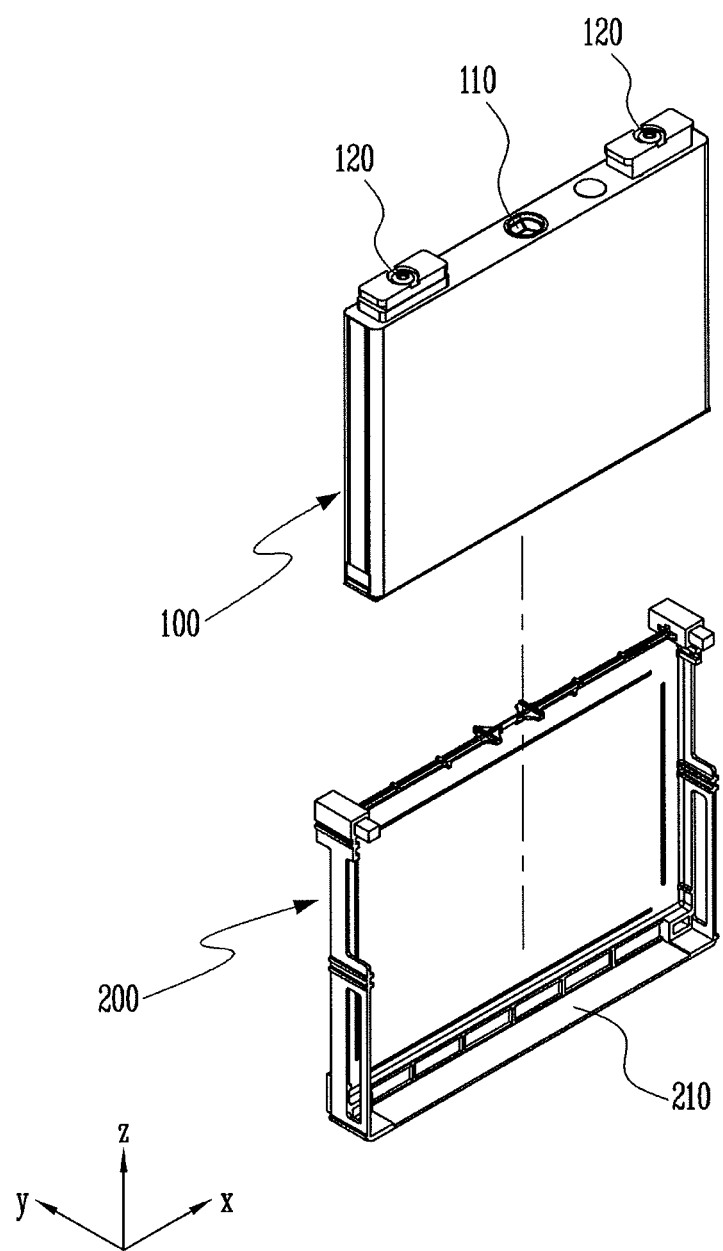
FIG. 3 illustrates an exploded perspective view of a barrier and a battery cell according to an embodiment.

FIG. 3 is an exploded perspective view of the barrier 200 and the battery cell 100 according to the present embodiment.

As shown in FIG. 3, the battery cell 100 has electrical terminals 120 exposed at a top thereof, and a vent portion 110 is provided between the terminals 120. The vent portion 110 is a component for allowing internal gas, etc., which may be generated due to an abnormal operation of the battery cell 100, to flow out to an outside of the battery cell 100.

The barrier 200 may be formed with a partition wall for allowing one battery cell 100 to be spaced apart from other adjacent battery cells 100, and may act as a structure for maintaining an exact interval between the battery cells 100 or pressing the battery cells 100. In this embodiment, a battery mounting portion 210 may be formed in the barrier 200. The battery cell 100 is mounted on the battery mounting portion 210. The battery cell 100 and the barrier 200 are repetitively disposed in a state in which the battery cell 100 and the barrier 200 are coupled to each other.

Figure 4:
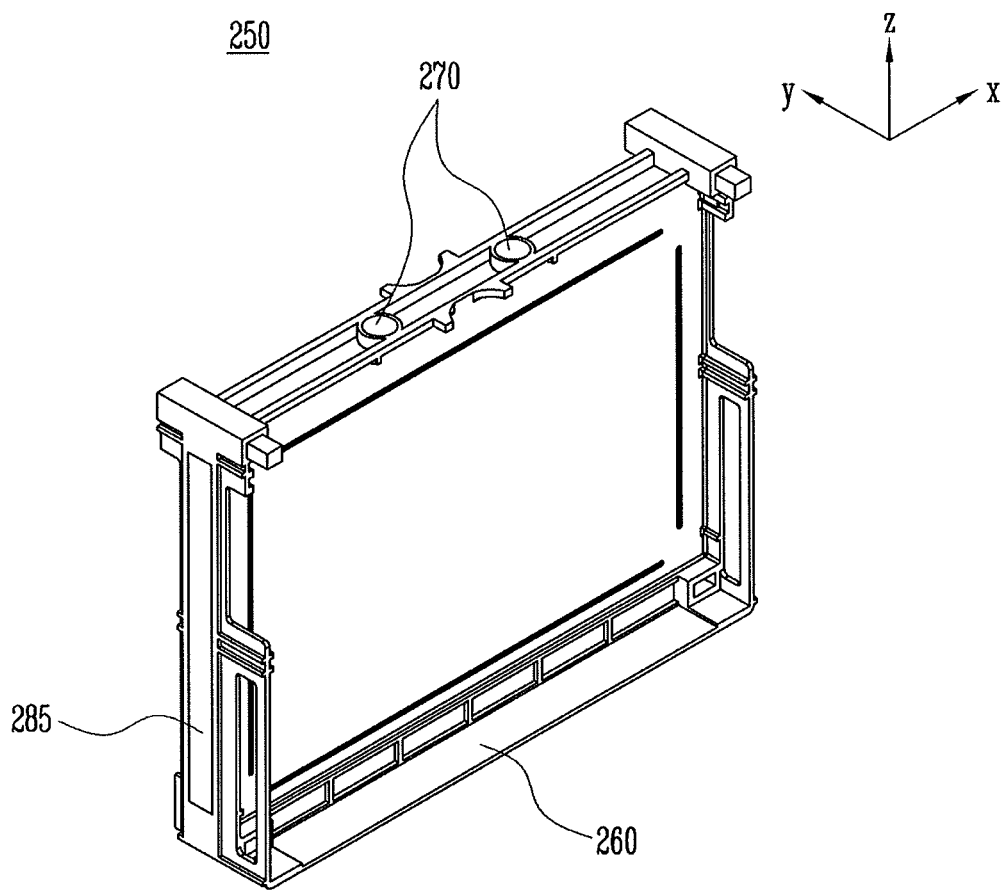
FIG. 4 illustrates a perspective view of a reinforcing barrier according to an embodiment.
Figure 5:
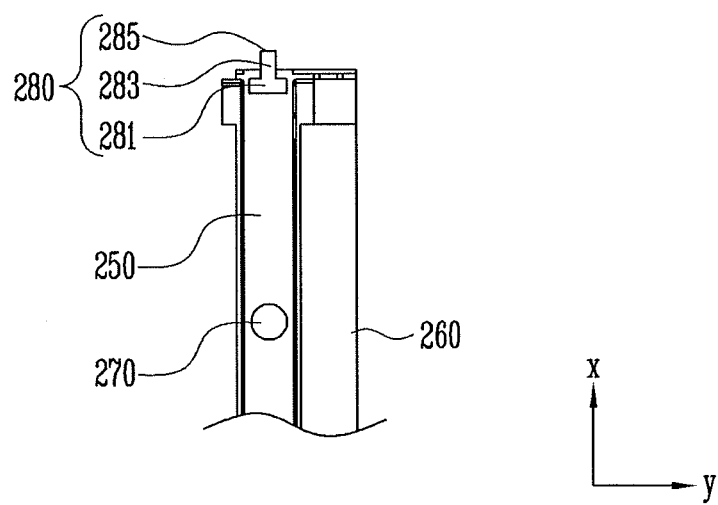
FIG. 5 illustrates a cross-sectional view of a reinforcing barrier according to an embodiment.
Figure 6:
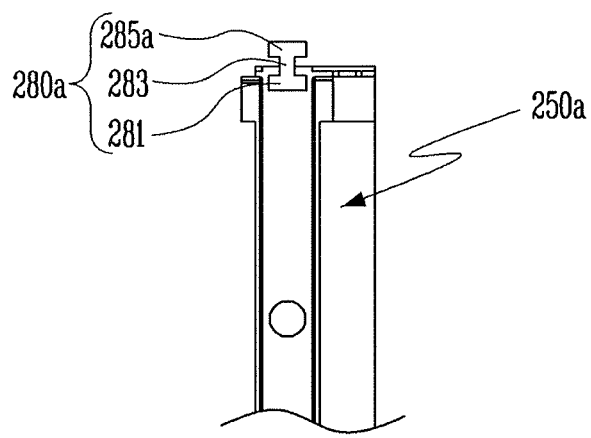
FIG. 6 illustrates a cross-sectional view of a reinforcing barrier according to another embodiment.
Figure 7:
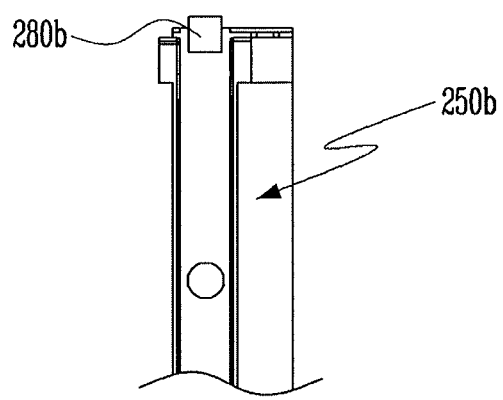
FIG. 7 illustrates a cross-sectional view of the reinforcing barrier according to still another embodiment.

FIG. 4 is a perspective view of the reinforcing barrier 250 according to the present embodiment, and FIG. 5 is a cross-sectional view of the reinforcing barrier 250. FIGS. 6 and 7 are cross-sectional views of reinforcing barriers according to other embodiments.

As shown in FIG. 4, a shape of the reinforcing barrier 250 is similar to that of the barrier 200 described above. That is, the reinforcing barrier 250 is formed into a partition wall structure, and a mounting portion 260 is formed at a lower portion of the reinforcing barrier 250 so that the battery cell 100 may be mounted thereon. For example, the reinforcing barrier 250 may have a frame structure attached to the mounting portion 260, so a bottom of a battery cell 100 may be positioned on the mounting portion 260 and four side surfaces of the battery cell 100 may contact the frame structure of the reinforcing barrier 250.

The reinforcing barrier 250 is a component which performs not only a function of isolating, e.g., separating, the battery cells 100 and maintaining an interval between the battery cells 100, but also a function of forming an outer frame structure, i.e., a rigidity structure, of the battery module 10 by being fastened to other components. For example, the reinforcing barrier 250 may be fastened to the side frames 500 of the battery modules 10 to increase rigidity of the battery nodule 10. In another example, a fastening hole 270, etc. may be formed in, e.g., a top of, the reinforcing barrier 250. In this case, the reinforcing barrier 250 may be fastened to other components through the fastening hole 270.

Since the reinforcing barrier 250 is a component for increasing the rigidity of the battery module 10, a thickness of the reinforcing barrier 250 is increased as compared with the other barriers 200, i.e., a total width of the reinforcing barrier 250 along the y-axis is larger than a total width of the barrier 200 along the y-axis. Further, unlike the barrier 200 described above, the reinforcing barrier 250 according to this embodiment has metal members 280 respectively inserted into both sidewalls, i.e., sides and/or surfaces facing the side frames 500 of the battery module 10.

In detail, the side frame 500 is a component on which the entire load of the battery module 10 is mostly concentrated. The side frame 500 is configured using a rigid material, e.g., stainless steel, having a predetermined rigidity or more. Further, the reinforcing barrier 250 includes the metal members 280 formed of the rigid material, e.g., stainless steel, to increase rigidity of the battery nodule 10.

That is, as a conventional barrier performs a function of, e.g., only, isolating battery cells and maintaining an interval between the battery cells, the conventional barrier is formed of only a synthetic resin. Since the conventional barrier is formed of a synthetic resin, the conventional barrier is limited in terms of its attachment or fastening to the side frame.

However, the battery module 10 according to this embodiment is provided with the reinforcing barrier 250, which includes the metal member 280 within a synthetic resin, so that the reinforcing barrier 250 can be both used as a separator between adjacent battery cells 100, i.e., via the synthetic resin, and as a rigidity reinforcing member, i.e., via the metal member 280 fixed to the side frame 500 through soldering, welding or the like.

The metal member 280 may include, e.g., stainless steel, etc. The metal member 280 may be formed using the same material as that of the side frame 500 to be directly welded to each other.

The reinforcing barrier 250 may be provided by replacing one barrier 200 among the barriers 200 described above or by being added to the barriers 200 when necessary. For example, the reinforcing barrier 250 may be provided at a central portion of the battery module 10 so as to uniformly distribute the structural load of the battery module 10. In a case where the length of the battery module 10 is further increased, the number of reinforcing barriers 250 may be increased. For example, the reinforcing barrier 250 may be provided at every ¼ point along a length of the battery module 10, e.g., the battery module 10 may include three reinforcing barriers 250 dividing the length of the battery module 10 into four equal parts.

The metal member 280 inserted into the reinforcing barrier 250 may be formed in various shapes. For example, referring to FIG. 5, the metal member 280 may be formed to have a T-shaped cross-section as seen in FIGS. 4-5. That is, the metal member 280 may include an inserting portion 281, an extending portion 283, and a welding portion 285. The inserting portion 281 is a portion inserted and fixed inside the reinforcing barrier 250, and the welding portion 285 is a portion exposed to an outside to be fixed to the side frame 500 described above, e.g., the welding portion 285 is a portion of the metal member 280 that faces and contacts the side frame 500. The extending portion 283 is a portion extended from the inserting portion 281 to the welding portion 285 by passing through a surface of the reinforcing barrier 250. In this case, a width of the inserting portion 281 is wider than that of the extending portion 283 along the y-axis, so that the metal member 280 cannot be separated from the reinforcing member 250 without breaking the reinforcing barrier 250.

In another embodiment, as shown in FIG. 6, a metal member 280a may be formed in an H shape. In this case, the inserting portion 281 and an extending portion 283 are formed in a same shape as those in FIG. 5, but a width of a welding portion 285a is wider than that in FIG. 5. As the width of the welding portion 285a is formed wide, the welding range of a reinforcing barrier 250a with the side frame described above is increased, thereby further increasing the structural rigidity after welding.

In yet another embodiment, as shown in FIG. 7, a metal member 280b may be formed in a shape of a simple bar. That is, the metal member 280b may be manufactured in a state in which the metal member is inserted inside the reinforcing barrier through injection molding or the like.

Figure 8:
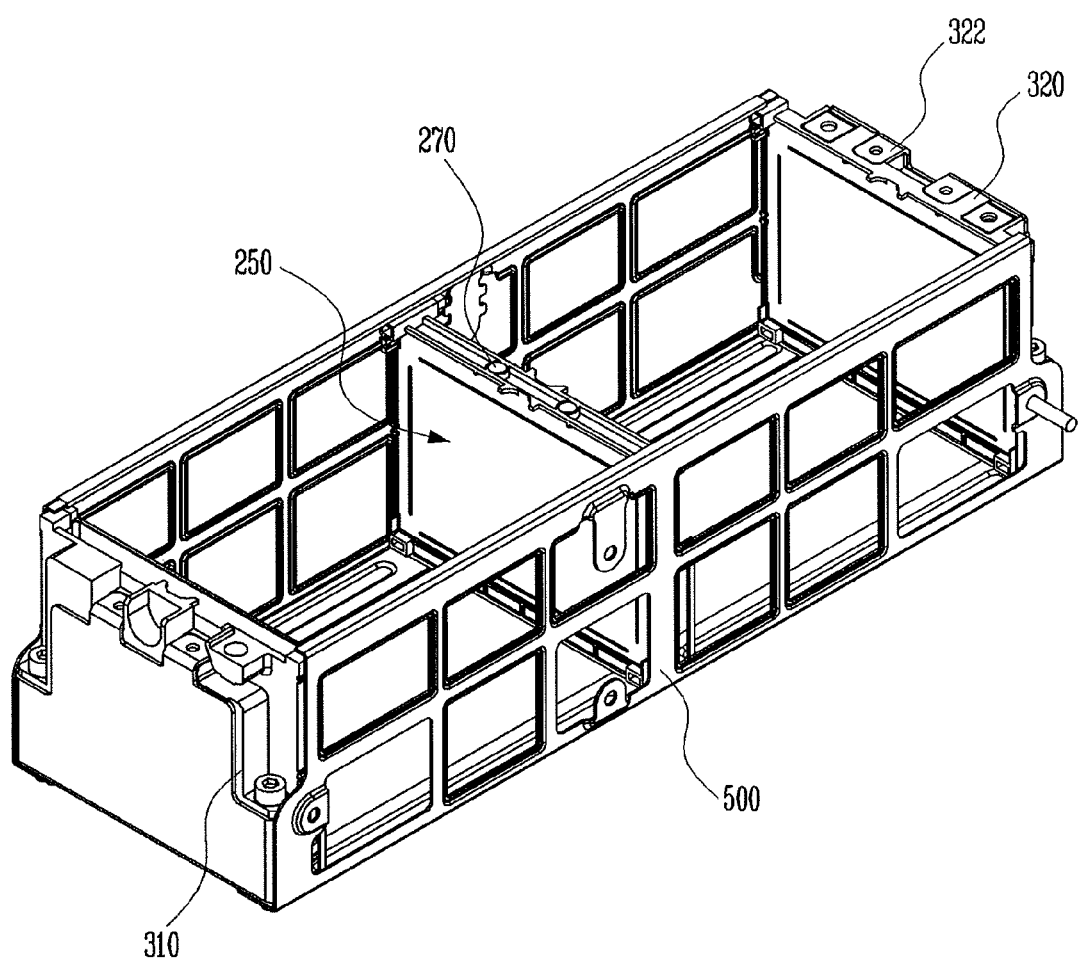
FIG. 8 illustrates a perspective view of a rigidity structure which forms a frame of a battery module according to an embodiment.

FIG. 8 is a perspective view of a rigidity structure which forms a frame of the battery module 10.

As shown in FIG. 8, the pair of side frames 500 and the pair of end blocks 310 and 320 are fastened or fixed to each other, thereby forming an outer frame in terms of the structure of the battery module 10. In this case, both end portions of the reinforcing barrier 250 are respectively welded to central portions of the side frames 500, so that the reinforcing barrier 250 is fixed to the side frames 500.

In this case, the reinforcing barrier 250 prevents the rigidity structure from being distorted at the central portion or from drooping due to the weight of the battery cells 100. The reinforcing barrier 250 is fixed or connected to other components through fastening holes 270 and 322, thereby increasing the structural rigidity.

Embodiments provide a battery module having a structure capable of maintaining stability even when the length of the battery module is increased. That is, the battery module includes a reinforcing barrier with a metal member therein, so a metal portion of the metal member is exposed to an outside to define a welding portion. As the exposed metal portion connects the reinforcing barrier to a side frame through welding or the like, the structural stability of the battery module is improved. Further, the metal member is manufactured so that a portion of the welding portion is inserted inside the reinforcing barrier through injection molding or the like, thereby improving the structural stability of the battery module. Also, a bonding technique, e.g., welding, may be applied so as to maintain the structural stability of a central portion of the battery module, based on the length direction of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
   a battery array including a plurality of battery cells arranged in a first direction and a plurality of separation barriers respectively interposed among the battery cells;
   side frames at two opposite sides of the battery array along the first direction; and
   at least one reinforcing barrier between two adjacent battery cells in the battery array, the at least one reinforcing barrier having an insulating side wall extending a second direction perpendicular to the first direction and a metal member in a surface of the insulating side wall facing a corresponding side frame, and the metal member being fixed to the corresponding side frame,
   wherein at least a portion of the metal member is inserted into the insulating side wall of the at least one reinforcing barrier without being exposed to mounting portions on which the two adjacent battery cells are mounted such that the metal member is electrically insulated from the two adjacent battery cells by the insulating side wall.

2. The battery module as claimed in claim 1, wherein the at least one reinforcing barrier is positioned at a center of the battery array, based on the first direction.

3. The battery module as claimed in claim 1, wherein the at least one reinforcing barrier is wider than one separation barrier along the first direction.

4. The battery module as claimed in claim 1, wherein the metal member includes a same material as the corresponding side frame.

5. The battery module as claimed in claim 4, wherein the metal member and the corresponding side frame include stainless steel.

6. The battery module as claimed in claim 1, wherein the metal member includes:
- an inserting portion inserted into an inside of the insulating side wall of the at least one reinforcing barrier;
- a welding portion exposed to an outside of the insulating side wall of the at least one reinforcing barrier, the welding portion being fixed to the corresponding side frame; and
- an extending portion extending from the inserting portion to the welding portion through a surface of the at least one reinforcing barrier.

7. The battery module as claimed in claim 6, wherein a width of the inserting portion is wider than that of the extending portion along the first direction.

8. The battery module as claimed in claim 6, wherein a width of the welding portion is wider than that of the extending portion along the first direction.

9. The battery module as claimed in claim 1, wherein the metal member and the at least one reinforcing barrier are injection molds.

10. The battery module as claimed in claim 1, wherein upper and lower end portions of the corresponding side frame are bent portions respectively bending toward upper and lower surfaces of the battery array.

11. The battery module as claimed in claim 10, further comprising a buffer member between the bent portions of the corresponding side frame and the battery array.

12. The battery module as claimed in claim 1, wherein the metal member of the at least one reinforcing barrier is exposed through the surface of the insulating side wall of the at least one reinforcing barrier to an exterior of the at least one reinforcing barrier.

13. The battery module as claimed in claim 1, wherein at least one separation barrier among the plurality of separation barriers is the at least one reinforcing barrier.

14. The battery module as claimed in claim 1, wherein only one of a reinforcing barrier or a separation barrier is between every two adjacent battery cells.

15. A method of manufacturing a battery module, the method comprising:
- arranging a plurality of battery cells in a first direction and a plurality of separation barriers respectively interposed among the battery cells to define a battery array;
- arranging side frames at two opposite sides of the battery array along the first direction; and
- affixing at least one reinforcing barrier between two adjacent battery cells in the battery array, the at least one reinforcing barrier including an insulating side wall extending a second direction perpendicular to the first direction and a metal member in a surface of the insulating side wall facing a corresponding side frame, and the metal member being fixed to the corresponding side frame by soldering or welding,
- wherein at least a portion of the metal member is inserted into the insulating side wall of the at least one reinforcing barrier without being exposed to mounting portions on which the two adjacent battery cells are mounted such that the metal member is electrically insulated from the two adjacent battery cells by the insulating side wall.

16. The method as claimed in claim 15, wherein the metal member and the at least one reinforcing barrier are formed through injection molding.

17. The battery module as claimed in claim 1, wherein the battery module includes only one reinforcing battery, the at least one reinforcing barrier being positioned at a center of the battery array, based on the first direction.

18. The battery module as claimed in claim 1, wherein a total width of the at least one reinforcing barrier along the first direction is larger than a total width of a single separation barrier.

19. The battery module as claimed in claim 1, wherein each of the separation barriers and the at least one reinforcing barrier includes a frame surrounding an entire perimeter of a respective battery cell, only a frame of the at least one reinforcing barrier among the at least one reinforcing barrier and the separation barriers includes the metal member.

* * * * *